United States Patent Office 2,764,977
Patented Oct. 2, 1956

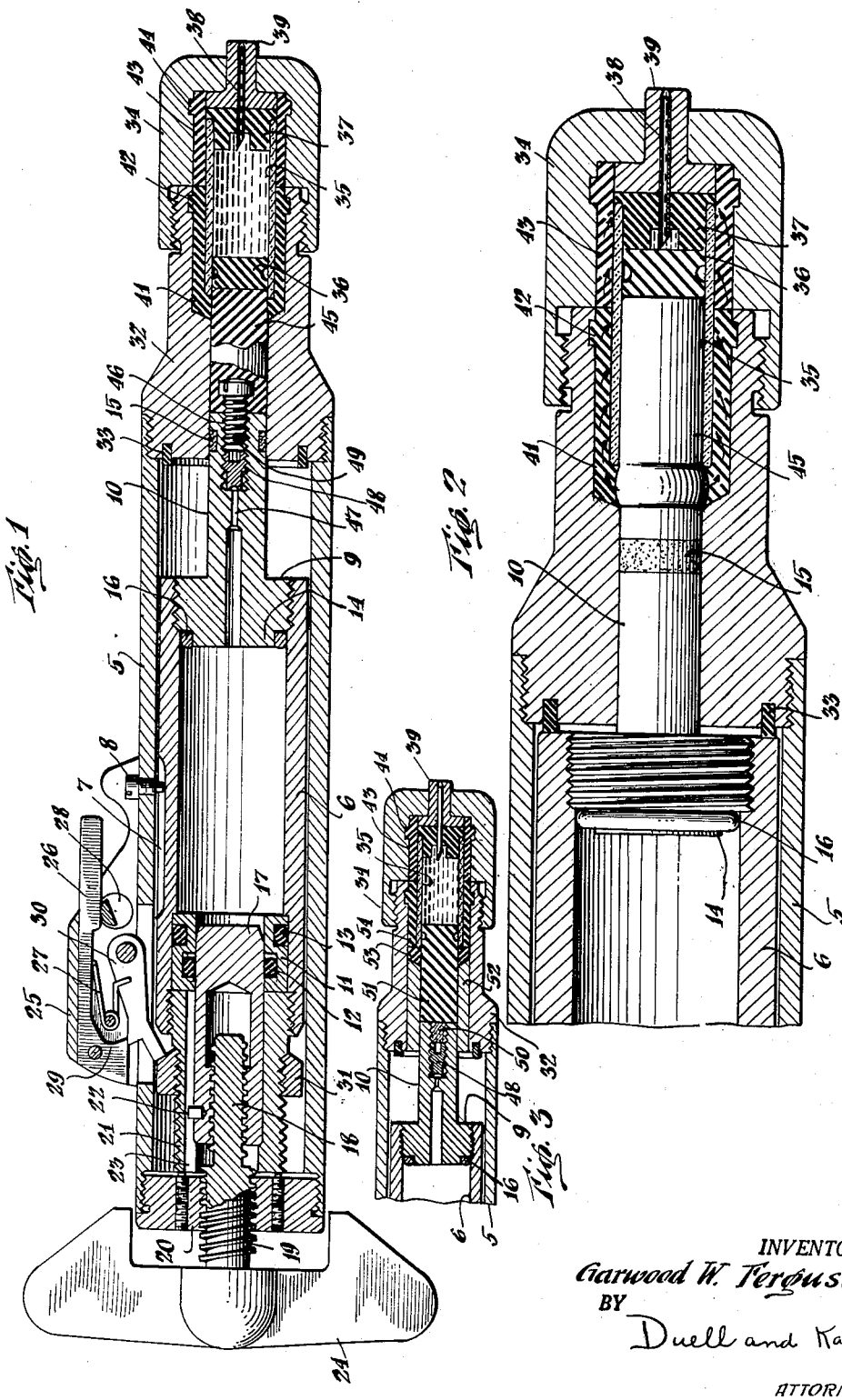

2,764,977

HYPODERMIC INJECTION MECHANISM

Garwood W. Ferguson, Paterson, N. J., assignor to Becton Dickinson and Company, Rutherford, N. J., a corporation of New Jersey Application May 24, 1951, Serial No. 228,015

5 Claims. (Cl. 128—173)

This invention relates to a structurally and functionally improved hypodermic injection mechanism and especially a mechanism by means of which medicament may be injected into tissues without employing a skin-piercing needle.

It is an object to furnish a structure which will adequately support an ampule or similar medicament-containing unit during the discharge of the mechanism. Moreover, by means of the present structure that mechanism may readily be loaded with a fresh ampule or unit and the spent or discharged ampule may be removed therefrom with equal facility.

A further object is that of providing in a mechanism of this type an accumulator and driving structure which may readily be potentialized for operation and when it is once in such operative condition will remain ready for instant use through long periods of time during which it may be stored or operated to perform a great number of injections.

An additional object is that of furnishing a mechanism of this nature which will embody relatively few parts each individually simple and rugged in design; such parts being capable of ready assemblage to furnish a unitary structure which may readily be used by a trained technician or a layman.

With these and other objects in mind reference is had to the attached sheet of drawings illustrating practical embodiments of the invention and in which:

Fig. 1 is a sectional side view of the injection mechanism;

Fig. 2 is an enlarged fragmentary sectional side view of one portion of that mechanism with the parts thereof disposed in a position different from that illustrated in Fig. 1; and Fig. 3 is a fragmentary sectional view showing an alternative form of structure.

Referring primarily to Fig. 1, the numeral 5 indicates the exterior casing or shell of the mechanism. This casing presents a bore within which a tube 6 is slidably mounted. Conveniently, a keyway 7 is furnished in the outer face of the tube and a bolt or screw 8 may be mounted by casing 5 to extend into this keyway. By such a structure the tube is prevented from rotating with respect to the casing. The forward end of the tube is closed by a plug 9 which has extending from its outer face a piston or post 10. The opposite end of the tube bore may be enlarged and receive a bushing 11 formed with adjacent grooves in its inner and outer faces.

The interior of the tube receives a charge of gas under pressure. The pressures employed may vary through a wide range. However, ordinarily, with the parts properly proportioned a pressure range of from 1,650 to 2,150 pounds per square inch will be proper. Compressed air may be employed as the gas. Again, however, it is preferred to employ nitrogen. An O-ring type of seal may be mounted within each of the grooves of bushing 11 and as indicated at 12 and 13 respectively. Plug 9 is conveniently formed with a rearward extension 14 encircled by an O-ring 16 bearing against the inner face of tube 6. Thus, if the bore of bushing 11 be suitably closed it is apparent that with gas under pressures such as aforenoted within the tube 6, no leakage of the charge will occur, the rings being constantly subjected to pressure. Post 10 is preferably provided with a groove within which an oil ring 15 of felt, or other suitable material, is disposed.

Extending through the bore of bushing 11 and in sealing contact with ring 12 is a plunger 17. The latter is conveniently formed with a threaded rear portion into which a forward series of threads forming a part of stem 18 extend. The rear portion of this stem is formed with a further series of threads 19 which are preferably pitched opposite to the threads of the forward series. Threads 19 engage the threaded bore of a cap 20 which is in turn mounted at the rear end of casing 5. Such mounting is conveniently achieved by threading the parts. A sleeve 21 has its forward end connected to the surface of the bore of tube 6 adjacent the rear of the latter. It bears against bushing 11 to prevent its displacement. Plunger 17 extends through the bore of this sleeve and is conveniently provided with a pin or other projecting portion 22 riding within a groove 23 formed in the inner face of sleeve 21. In this manner it is apparent that rotation of plunger 17 with respect to the sleeve is prevented.

Stem 18 may be turned in any desired manner. For example, an actuator 24 may be secured to its rear end at a point beyond the cap 20. A triggering mechanism is conveniently provided by securing to the outer face of casing 5 an extension or housing 25. This housing has projecting into it a trigger in the form of a pivotally mounted member 26 urged in an upward direction by spring 27. A rotatable pin 28 extends across the housing adjacent the lever 26 and is formed with a notch or interruption. In this manner a "safety" is furnished except when pin 28 is turned to a point at which its notch aligns with lever 26. That lever carries at its forward end a projecting portion 29. The tooth of a pawl 30 may be disposed adjacent this projection. Such pawl is pivotally mounted by the housing 25. That end of spring 27 opposite to the one acting against lever 26 bears against pawl 30. The rear end of this detent element thrusts against the forward face of a nut 31. The latter is adjustably mounted upon the outer face of sleeve 21 preferably by means of screw threads.

A medicament chamber is formed adjacent the forward end of casing 5 by, for example, securing an extension 32 to that forward end. This extension may carry on its rear face a cushioning element 33 to be engaged by the forward edge of tube 6. A loading cap 34 is in turn supported by the extension 32. As shown, a connection between these parts may be furnished by screw threads. It will be apparent that any other form of quick detachable coupling might be employed at this point. The extension 32 and loading cap 34 provide bores of a diameter such that they may receive an ampule. This will conveniently embrace a tube 35 of glass or other suitable material, having adjacent its rear end a piston type stopper 36 and adjacent its forward end a perforable stopper 37. The latter is penetrated by the rear pointed end of a cannula 38 conveniently mounted by a tip 39 projecting through a central orifice in the forward face of the loading cap. Either the cannula or the outer end of the tip are constricted to define an orifice of minute cross section. While the diameter of this orifice may vary through a wide range, it is preferred that it be on the order of from .003" to .01".

Extension 32 is provided with a restricted bore having a diameter adequate to receive piston or post 10. The diameter of the bore will enlarge at a point short of the rear end of the ampule or other medicament-containing member providing the fluid chamber. A sleeve 41 of rubber extends forward of the restricted bore portion. This sleeve conveniently terminates in line with the forward edge of the extension 32 and is secured against movement with respect to the same by, for example, a rib portion 42 which extends into a recess formed in the surface of that extension. A continuation of sleeve 41 is provided as a part of loading cap 34. This continuation will be in the form of a sleeve 43 having a diameter precisely equal to the outer end of sleeve 41 and firmly abutting the forward edge of the latter when the loading cap is in position. Displacement of sleeve 43 with respect to the loading cap may again be prevented by forming a rib 44 integral with that sleeve and having it extend into a groove formed in the loading cap. Both sleeves 41 and 43 are lightly lubricated at the time the parts are assembled. To this end silicon grease may be employed. Ring 15 will assure lubrication between extension 45 and the bores of members 32, 41 and 35.

In Fig. 1 it will be observed that piston 10 has secured to it an extension 45. This extension is preferably formed of rubber and has a diameter such that it may enter the bore of ampule tube 35 and project stopper 36 through the same. The extension 45 reciprocates in unison with the piston 10 by providing any suitable form of coupling between these parts. Conveniently, this coupling may take the form of a headed bolt or screw 46, the head of which is molded into the rear portion of the extension. A bore 47 is formed in the piston 10 and extends throughout the latter and the body of plug 9. Within this bore and in advance of bolt 46 is a screw 48 having a cup point, or outer end. The edge of this screw will bite into the flange defining the restricted portion of the bore to seal the gas within tube 6 against escape; clearance 49 existing between this screw and the bolt. By this construction it is obvious that the extension 45 may be renewed when necessary by simply unscrewing the latter and thereafter mounting a new extension in position. Likewise, with the extension removed, the screw 48 may be dismounted. With bore 47 thus opened, the interior of tube 6 may be charged with gas and if recharging becomes necessary this may also be accomplished.

In the form of construction in Fig. 3 the same reference numerals have been employed to designate similar parts which are illustrated in Figs. 1 and 2. In this unit the bore of post or piston 10 is preferably closed by a plug or mass of sealing wax 50 at a point beyond screw 48. Disposed within the rear end of ampule tube 35 is a plunger-stopper 51. The latter is preferably formed of natural or artificial rubber and may have its surface coated with a silicone grease. Surrounding the stopper 51 adjacent the rear edge of tube 35 is a flange 53 which again is preferably formed of natural or synthetic rubber. As suggested in this figure, the restriction in the bore of extension 32 may be arranged by employing a separate sleeve 52 secured against movement with respect to that extension and terminating a distance in advance of the rear edge of tube 35 equal to the height of flange 53.

If no separate sleeve is employed then the entire bore surface of extension 32 may be defined by parts integral with that unit. Contrary to the structure shown in Figs. 1 and 2 the sleeve 54 does not extend around the rear edge of the ampule tube. Rather it bears against the forward edge of the annular flange member 53 which slidably encircles the plunger stopper 51. Sleeve 54 firmly abuts the rear edge of sleeve 43 mounted by the loading cap when the latter is in position as shown in Fig. 3.

Considering, for example, the operation of the force-producing mechanism, it is apparent that with the parts in the position shown in Fig. 1, the actuator 24 may be turned. With such turning, stem 18 will cause a projection of plunger 17 into the interior of tube 6. In this manner the body of gas within that casing will be further compressed. Due to the preferable opposite threading of the rear series 19 and the forward series of screw threads on the stem, the projection of the plunger will be relatively rapid. During this "cocking" of the parts tube 6 will be restrained from movement by pawl 30 engaging the forward face of nut 31. With the device fully cocked pin 28 may be rotated. If now lever 26 is swung downwardly, projecting portion 29 will clear the adjacent tooth of pawl 30. Due to the camming action of the parts and despite the thrust exerted by spring 27, pawl 30 will thereupon clear the surface of nut 31. Therefore, all parts secured against movement with respect to tube 6 will be projected towards tip 39. The amount of stroke thus achieved may, of course, be varied by adjusting the position of the nut 31 along the sleeve 21. No locking parts have been shown for this nut but these obviously may be employed. The bores of sleeves 41 and 43 as in Fig. 1 will present a diameter such that they may freely receive ampule tube 35. Therefore, with that tube and the loading cap 34 in position, a projection of extension 45 results in a distending of the latter into the space intervening the bore portion as defined by sleeve 41 and the rear end of ampule 35 as in Fig. 2. With extension 45 and sleeves 41 and 43 formed of a proper rubber or synthetic rubber they will be substantially incompressible. Thus, if extension 45 is distended, the rear end portion of sleeve 41 will be subjected to a compressive action. This will be transmitted as also shown in Fig. 2 to sleeve 43. With these sleeves contained in non-expansible members their bores will, therefore, be constricted. This will serve to bring the sleeves into intimate bearing engagement with the outer face of the ampule. Accordingly, the pressure exerted against this outer face will substantially equal the pressure exerted upon the fluid within the ampule. Accordingly, even with the ampule formed of glass there will be no danger of its being shattered.

After the parts have been completely discharged as in Fig. 2, piston 10 may be retracted. This retraction is effected by turning stem 18 in a direction such that it will cause a withdrawal of plunger 17. With tube 6 projected the rear shoulder portion of sleeve 21 will lie immediately adjacent the rear end of plunger 17. Therefore as the latter is withdrawn, it will retract the sleeve and tube 6 to a point where the pawl or latch 30 overrides the nut or keeper 31. When this position of the parts has once been established, then the direction of rotation of stem 18 may be reversed to project plunger 17. With such retraction the pressures will be relieved. The loading cap 34 may be dismounted and the spent or discharged ampule withdrawn and discarded. With piston 10 retracted to the position shown in Fig. 1, a fresh ampule may be inserted into the bore of sleeve 41. Thereupon, loading cap 34 may be mounted upon extension 32. With such mounting cannula 38 will pierce stopper 37. This will be evidenced by medicament appearing adjacent the outer end of the tip or nozzle. The device is now reloaded and the procedure as aforedescribed may again be followed.

It will be apparent that the operation of the mechanism as shown in Fig. 3 will correspond generally to the operation of the parts as heretofore described in connection with Figs. 1 and 2. In other words, despite the fact that the plunger or stopper 51 forms a part of the ampule assembly rather than being fixed against movement with respect to post 10, that plunger will be projected into the bore of ampule tube 35 as the device is "fired." During this movement and because of the pressures developed, plunger 51 will distend into the space intervening the restricted bore portion of extension 32 and the rear edge of ampule tube 35 in a manner similar to that illustrated in connection with extension 45 in Fig. 2. In such projection of the plug 51 the latter will have sliding engagement with the surface of the flange or collar 53 which will remain in effect immovable with respect to extension 32. However, it will function to transmit the force thrust to sleeves 54 and 43. This will constrict the bores of these sleeves into firm supporting engagement with the outer face of the ampule to desirably support the latter.

Thus, among others, the several objects of the invention as aforenoted are achieved. Obviously numerous changes in construction and rearrangement of the parts might be resorted to without departing from the spirit of the invention as defined by the claims.

I claim:

1. A hypodermic injection mechanism including in combination a casing having front and rear ends and formed with an ampule receiving chamber adjacent its front end, a tube slidable within said casing and charged with gas under pressure, a piston carried by one end of said tube and projectable by the same into said chamber, a trigger mechanism carried by said casing and acting against said tube to retain the latter in a retracted position, a rigid plunger slidably supported by said tube to advance into the bore of the latter and compress the gas therein and manually operable force-compounding means movably mounted at the rear end of said casing and connected to said plunger for advancing the latter into the tube.

2. A hypodermic mechanism as specified in claim 1, said force-compounding means comprising a rotatable stem having threaded connection with said casing, its outer end extending beyond the rear casing end and its inner end being movably connected with said plunger.

3. A hypodermic mechanism as specified in claim 1, and means connected to said force-compounding means and said tube whereby in response to an operation of the former the latter will be retracted towards the rear end of said casing.

4. In a hypodermic injection mechanism in combination a medicament-containing ampule, a body presenting a chamber receiving said ampule, said chamber having a length greater than that of said ampule, a lining of material extending throughout said chamber to enclose said ampule and projecting beyond one end of the latter, said material incorporating displaceable characteristics whereby pressure applied to the extended portion of such lining will cause the latter to constrict around said ampule, a piston projectable into said chamber to exert pressure against said ampule, said piston moving in slidable contact adjacent the extended portion of the lining and said piston being formed to axially expand under resistance encountered by it as a result of projection into said chamber, the expansion of said piston resulting in its pressing against the extended portion of said lining to cause the latter to exert pressure against said ampule.

5. A hypodermic mechanism as specified in claim 4 both said lining and the part of the piston moving adjacent thereto being formed of a material having rubber-like characteristics.

References Cited in the file of this patent

UNITED STATES PATENTS

| | | |
|---|---|---|
| 1,139,368 | Pierce | May 11, 1915 |
| 2,445,477 | Folkman | July 20, 1948 |
| 2,547,099 | Smoot | Apr. 3, 1951 |
| 2,550,053 | Ferguson | Apr. 24, 1951 |
| 2,626,087 | Howard et al. | Jan. 20, 1953 |
| 2,635,601 | May | Apr. 21, 1953 |
| 2,653,602 | Smoot | Sept. 29, 1953 |
| 2,653,605 | Hein | Sept. 29, 1953 |